United States Patent
Walton

(10) Patent No.: US 6,728,696 B1
(45) Date of Patent: Apr. 27, 2004

(54) METHOD AND APPARATUS FOR GENERATING A KEYWORD LIST FROM TABLES TO FACILITATE SEARCHING AN ELECTRONIC CATALOG

(75) Inventor: Robin Richard Walton, Newcastle-under-Lyme (GB)

(73) Assignee: Fujitsu Services Limited, London (GB)

( * ) Notice: Subject to any disclaimer, the term of this patent is extended or adjusted under 35 U.S.C. 154(b) by 511 days.

(21) Appl. No.: 09/650,391

(22) Filed: Aug. 29, 2000

(30) Foreign Application Priority Data

Oct. 21, 1999 (GB) .............................................. 9924805

(51) Int. Cl.$^7$ .............................................. G06F 17/30
(52) U.S. Cl. ..................... 707/2; 707/3; 707/9; 707/10; 707/102
(58) Field of Search ................................. 345/705, 708, 345/713, 810, 811, 814; 707/3, 9, 10, 104.1, 2, 102; 705/26–29

(56) References Cited

U.S. PATENT DOCUMENTS

| | | | | |
|---|---|---|---|---|
| 4,318,184 A | | 3/1982 | Millett ........................... 707/1 |
| 4,873,634 A | * | 10/1989 | Frisch et al. ................. 715/533 |
| 5,041,967 A | * | 8/1991 | Ephrath et al. .............. 345/825 |
| 5,369,763 A | * | 11/1994 | Biles ............................... 707/3 |
| 5,469,355 A | * | 11/1995 | Tsuzuki ......................... 704/9 |
| 5,740,425 A | * | 4/1998 | Povilus ....................... 707/100 |
| 5,752,025 A | * | 5/1998 | Shakib et al. ............... 707/102 |
| 5,842,218 A | * | 11/1998 | Robinson ..................... 707/102 |
| 5,946,678 A | * | 8/1999 | Aalbersberg ................... 707/3 |
| 5,974,407 A | * | 10/1999 | Sacks ............................. 707/2 |
| 5,974,409 A | * | 10/1999 | Sanu et al. ..................... 707/3 |
| 6,055,516 A | * | 4/2000 | Johnson et al. ............... 705/27 |
| 6,154,740 A | * | 11/2000 | Shah .............................. 707/7 |
| 6,161,139 A | * | 12/2000 | Win et al. ................... 709/225 |
| 6,256,623 B1 | * | 7/2001 | Jones ............................. 707/3 |
| 6,321,224 B1 | * | 11/2001 | Beall et al. .................... 707/5 |
| 6,356,899 B1 | * | 3/2002 | Chakrabarti et al. ........... 707/5 |
| 6,405,208 B1 | * | 6/2002 | Raghavan et al. .......... 707/102 |
| 6,411,960 B1 | * | 6/2002 | Fisher ......................... 707/102 |
| 2002/0065812 A1 | * | 5/2002 | Keith, Jr. ........................ 707/3 |
| 2002/0103787 A1 | * | 8/2002 | Goel et al. ..................... 707/3 |

OTHER PUBLICATIONS

Netscape Communication 4.51 "Help system", 3/99.
Novell Groupwise 4.1a "Help system", 11/96.
Corel Wordperfect Suite 8 "Help system", 6/97.

\* cited by examiner

Primary Examiner—Jean R. Homere
Assistant Examiner—Leslie Wong
(74) Attorney, Agent, or Firm—Barnes & Thornburg

(57) ABSTRACT

A computer-implemented method is described, for searching for items in an electronic catalog, e.g. an on-line catalog accessible over the Internet. A hierarchy of category names is defined, each item in the electronic catalog being associated with one of those category names. When a search page is accessed, the category names are scanned, to generate a list of words that appear in the category names at any level of the hierarchy. The list of words is displayed in the search page, allowing a user to select one. When the user selects a word from the list, a list of items whose category names contain the selected word is displayed.

8 Claims, 3 Drawing Sheets

METHOD AND APPARATUS FOR GENERATING A KEYWORD LIST FROM TABLES TO FACILITATE SEARCHING AN ELECTRONIC CATALOG

BACKGROUND TO THE INVENTION

This invention relates to a method for searching for items in an electronic catalog. The invention is particularly, although not exclusively, concerned with on-line electronic catalogs that allow a user to purchase selected products over a network such as the Internet.

It is convenient to organise the items in an electronic catalog in a hierarchy of categories. For example, in a catalog for office supplies, the items may be grouped into top-level categories such as "hardware" and "consumables", which in turn are subdivided into lower-level categories. The user can then search this hierarchy, to find the desired items.

However, a problem with such an arrangement is that related items may appear in different branches of the hierarchy. For example, printers (such as laser printers) may appear under the "hardware" top-level category, while paper and toner for printers may appear in respective sub-categories under the "consumables" top-level category. This can make it difficult for the user to find items.

The object of the present invention is to provide a way of making it easier for a user to find items in a hierarchically-structured electronic catalog.

SUMMARY OF THE INVENTION

According to the invention, a computer-implemented method for searching for items in an electronic catalog comprises the steps:

(a) defining a hierarchy of category names, and associating each item in the electronic catalog with one of those category names;

(b) searching the hierarchy of category names and generating a list of words that appear in the category names at any of a plurality of different levels of the hierarchy;

(c) displaying the list of words to a user, and allowing a user to select a word from the list; and (d) when the user selects a word from the list, displaying a list of items whose category names contain the selected word.

DESCRIPTION OF AN EMBODIMENT OF THE INVENTION

One method in accordance with the invention will now be described by way of example with reference to the accompanying drawings.

Figure 1:
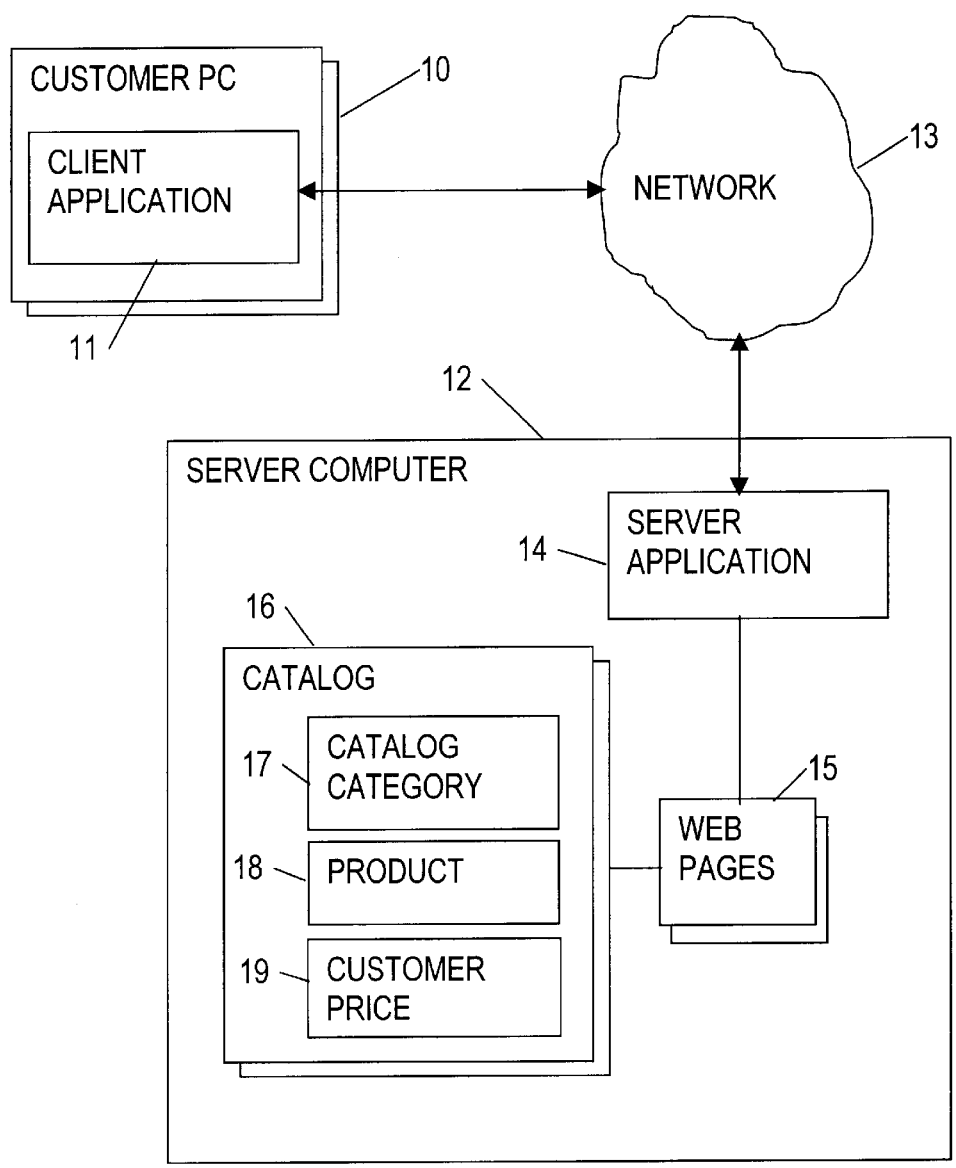
FIG. 1 is a schematic diagram of a computer system for providing an electronic catalog service.

FIG. 1 shows a computer system for providing an electronic catalog service to a number of customers. Each customer has a personal computer (PC) 10, which runs a client application 11. The client application may be a standard web browser, or may be a bespoke application. The customer PCs are connected to one or more server computers 12, by way of a network 13. In this example, the network 13 may be the Internet, or an in-house Intranet.

Each server computer runs a server application 14, for delivering a number of web pages 15 to the client applications. The web pages provide an interface to one or more electronic catalogs 16, allowing a customer to view the catalogs, to select items, and to place orders for the selected items. In the present example, the web pages 15 are implemented as active server pages (ASP).

Each catalog 16 includes a database structure, including the following tables: CatalogCategory (17), Product (18), and CustomerPrice (19), as well as other tables, not shown.

Figure 2:
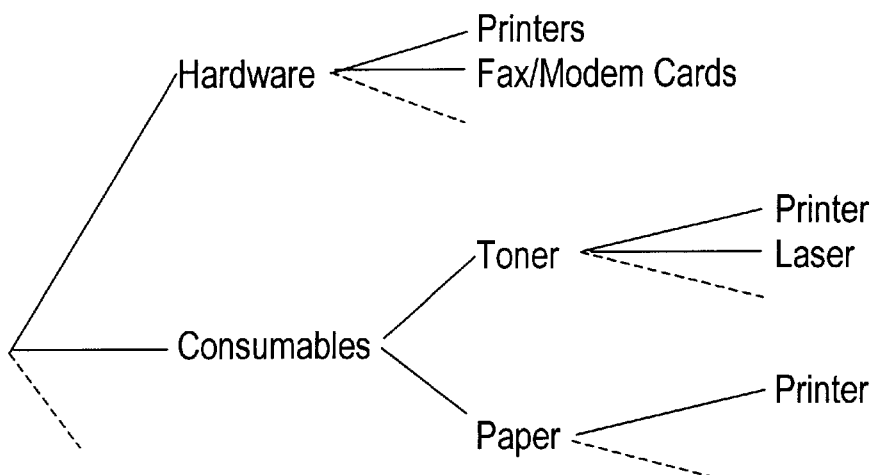
FIG. 2 is a diagram showing a hierarchy of category names.

The CatalogCategory table 17 defines a hierarchical (tree-like) structure of categories for items in the catalog. As an example, FIG. 2 shows part of a possible category hierarchy. This hierarchy can be defined by a CatalogCategory table as follows:

| Catalog Index | Catalog IndexText | Category Level | Parent Index | ... |
|---|---|---|---|---|
| 1 | Hardware | 1 | 0 | ... |
| 2 | Printers | 2 | 1 | ... |
| 3 | Fax/Modem Cards | 2 | 1 | ... |
| : | : | : | : | ... |
| 10 | Consumables | 1 | 0 | ... |
| 11 | Toner | 2 | 10 | ... |
| 12 | Printer | 3 | 11 | ... |
| 13 | Laser | 3 | 11 | ... |
| : | : | : | : | ... |
| 20 | Paper | 2 | 10 | ... |
| 21 | Printer | 3 | 20 | ... |
| : | : | : | : | ... |

It can be seen that the CatalogCategory table includes the following columns:

CatalogIndex—an index number, uniquely identifying a particular category.

CatalogIndexText—a text string, indicating the name of the category.

CategoryLevel—a number indicating the level of the category within the hierarchy. The top-level categories ("Hardware" and "Consumables") are at level 1. In the present example, the hierarchy is restricted to three levels, i.e. the maximum level number is 3.

ParentIndex—a pointer to the parent of the current category within the hierarchy. In the above example, "Consumables" is the parent category for "Toner" and "Paper".

The Product table 18 contains an entry for each product in each of the electronic catalogs. This table includes the following columns:

PartNumber—a number identifying a particular product.

CatalogIndex—a reference to an entry in the CatalogCategory table.

It can be seen that the Product table therefore assigns each product to a particular category. In general, all products of the same type (e.g. printers) are assigned to the same category.

The CustomerPrice table 19 includes the following columns:

CustomerCode—a code identifying a particular customer catalog.

PartNumber—a reference to an entry in the Product table, identifying a particular product.

Price—the price of this product in this catalog. (Different catalogs may contain different prices, depending on discounts etc. that may have been negotiated).

The CustomerPrice table holds an entry for every permitted combination of customer and product. If an entry does not exist for a particular customer-product combination, this means that the customer in question is not able to access this product through the electronic catalog system.

Figure 3:
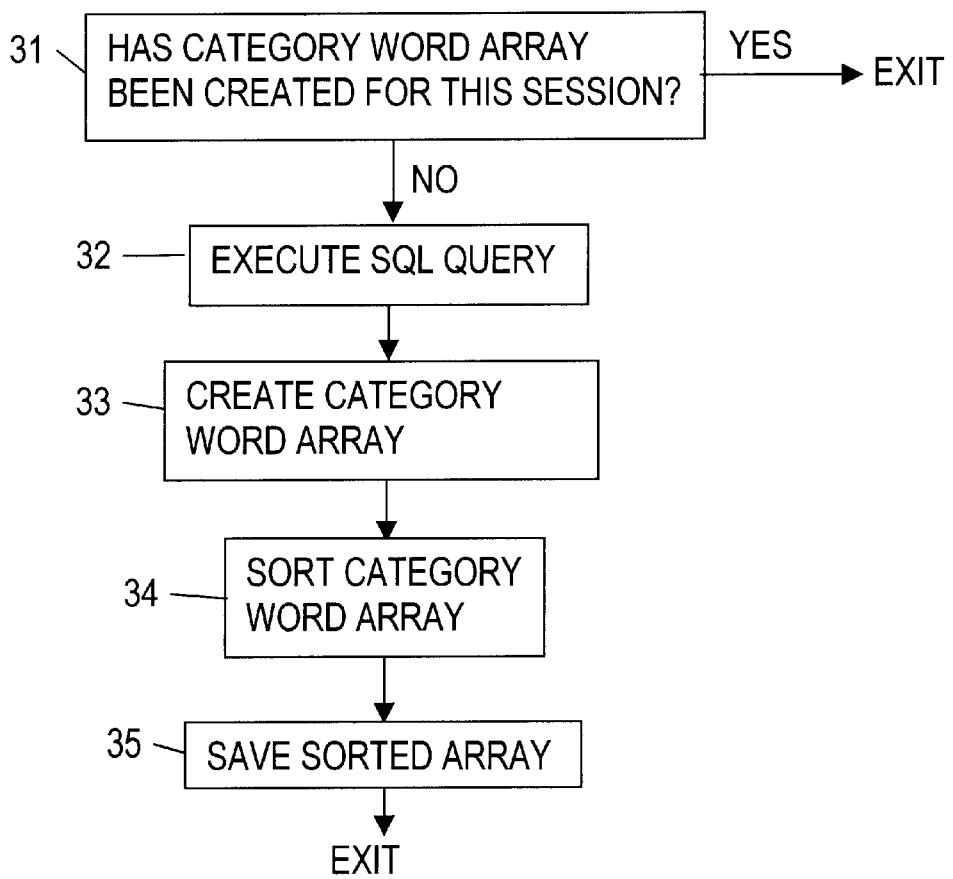
FIG. 3 is a flowchart depicting a process for generating a list of words that appear in category names.

The web pages 15 include a "Search" page, which allows a customer to search for products. Whenever this search page is opened, a SelectWords routine is executed, e.g. by means of ASP code embedded in the page. Referring to FIG. 3, the SelectWords routine performs the following steps.

(Step 31) The SelectWords routine first checks whether an array, referred to hereinafter as the SortedCategoryWords array, has already been created for the present session. If so, the SelectWords routine immediately exits. If, on the other hand, a SortedCategoryWords array has not yet been created in the present session, the routine continues with the following steps.

(Step 32) SelectWords executes an SQL query on the database tables 17–19, and stores the result in a result set RS. The SQL query is as follows:

SELECT CatalogIndexText, cc.CatalogIndex
FROM CatalogCategory cc, CustomerPrice cp, Product p
WHERE cc.CatalogIndex=p.CatalogIndex
　　AND cp.PartNumber=p.PartNumber
　　AND cp.CustomerCode=SessionCC
UNION
SELECT cc2.CatalogIndexText, cc2.CatalogIndex
FROM CatalogCategory cc, CatalogCategory cc2, CustomerPrice cp,
Product p
WHERE cc.CategoryLevel=3
　　AND cc.ParentIndex=cc2.CatalogIndex
　　AND cc.CatalogIndex=p.CatalogIndex
　　AND cp.PartNumber=p.PartNumber
　　AND cp.CustomerCode=SessionCC In the above, SessionCC represents the customer code of the customer who initiated the current session.

It can be seen that the first part of this query (up to the keyword "UNION") selects CatalogIndexText and CatalogIndex from the CatalogCategory table for all cases where an item in the category in question may be ordered by the current customer.

These categories will all be leaf nodes of the category hierarchy. The second part of this query (following the keyword "UNION") selects these values from all entries in the CatalogCategory table that are parents of level 3 entries that may be ordered by the current customer.

As an example, the result set RS might appear as follows:

| CatalogIndexText | Catalog Index |
| --- | --- |
| Printers | 2 |
| Fax/Modem Cards | 3 |
| Printer | 12 |
| Laser | 13 |
| Printer | 21 |
| Toner | 11 |
| Paper | 20 |

(Step 33) Each of the results in RS is then selected in turn, until the last result in RS is reached. For each result in RS, a SplitWords function is called. This splits compound entries in the CatalogIndexText (i.e. entries comprising multiple words separated by spaces and slashes) into discrete words. For example, the entry "Fax/Modem Cards" is split into three separate words "Fax", "Modem" and "Cards".

The SplitWords function in turn calls a CheckWord function, which replaces certain predetermined words with a generalised version of that word, which covers variants of the word and related words. For example:

"CD", "CD-R", "CD-ROM" or "CD-ROMs" is replaced by "CD(-R)/CD-ROM(s)"
"Card" or "Cards" is replaced by "Card(s)"
"Modem" or "Modems" is replaced by "Modem(s)"
"Printer", "Printers", "Print" or "Printing" is replaced by "Print(ing)/Printer(s)"

The CheckWord function thus provides a way of removing certain inconsistencies in the category names. Any words not replaced by CheckWord (such as "Fax", "Toner" and "Paper") simply remain as they are.

Each of these words is then added to a CategoryWords array, along with its corresponding CatalogIndex number. If the word already appears in the array, the CatalogIndex number is simply appended to the existing entry for that word, separated by a comma from the previous number.

As an example, the CategoryWords array might appear as follows:

| Word | Catalog Index |
| --- | --- |
| Print(ing)/Print(ers) | 2, 12, 21 |
| Fax | 3 |
| Modem(s) | 3 |
| Card(s) | 3 |
| Laser | 13 |
| Toner | 11 |
| Paper | 20 |

CategoryWords thus comprises a list of words that appear in the category names at any level of the hierarchy, together with a comma-separated list of CatalogIndex values for each of those words.

(Step 34) CategoryWords is then sorted into alphabetical order on "Word", to produce a new array, SortedCategoryWords.

(Step 35) SortedCategoryWords is then stored in a session variable, so that it will be available the next time the customer accesses the search page in the same session.

Figure 4:
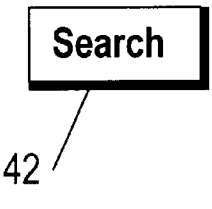
FIG. 4 is a simplified view of a typical Search page for use in searching for items in the catalog.

FIG. 4 is a simplified view of a typical Search page. The page includes a drop-down list 41, in which all the words from SortedCategoryList are displayed. The customer can select any one of these words, by clicking on it in the normal manner.

The page also includes a Search button 42. Clicking on this button calls a function that looks up the selected word in the SortedCategoryWords array, to get the CatalogIndex values associated with that word. These CatalogIndex values are then used to look up the other database tables, to get information about the associated products, and a list of these products is displayed in a scrollable window 43. The displayed list of products may for example be sorted into price order or alphabetically. In the example shown in FIG. 4, the customer has selected "Print(ing)/Print(ers)", and as a result a list of all products whose category names contain the words "Printer", "Printers", "Print" or "Printing" is displayed in the window 43.

The customer may then select products from this list, for adding to a purchase order. The manner in which the products are selected and the purchase order is processed form no part of the present invention and so will not be described further.

Some Possible Modifications

It will be appreciated that many modifications may be made to the system described above without departing from the scope of the present invention. For example, the category hierarchy is not necessarily restricted to three levels. Also, different catalogs 16 may reside on different computers.

What is claimed is:

1. A computer-implemented method for searching for items in an electronic catalog, said method comprising the steps:

(a) providing a catalog category table comprising a plurality of entries, each entry containing a category name along with information defining a position within a hierarchical structure of categories;

(b) providing a product table comprising a plurality of entries, each entry containing an identifier for a particular item in said electronic catalog along with a pointer referencing an entry in said catalog category table, thereby associating each item in the electronic catalog with one of said categories;

(c) searching the catalog category table to find words that appear in the category names, and generating a category words array comprising a list of said words along with pointers referencing respective entries in said catalog category table, thereby associating each of said words at any level of the hierarchy with at least one of said categories;

(d) displaying the list of words to a user, and allowing a user to select a word from the list; and (e) displaying a list of items from said electronic catalog to the user.

2. A method according to claim 1 wherein the step of generating the category words array includes replacing predetermined words with generalised versions of those words.

3. A method according to claim 1 wherein the category words array is re-generated for each new session initiated by a user.

4. A method according to claim 1 further including storing a table specifying which items each user is permitted to order, and wherein the step of generating the list of words includes selecting only words appearing in category names corresponding to items that a current user is permitted to order.

5. A computer system for searching for items in an electronic catalog, said computer system comprising:

(a) a catalog category table comprising a plurality of entries, each entry containing a category name along with information defining a position within a hierarchical structure of categories;

(b) a product table comprising a plurality of entries, each entry containing an identifier for a particular item in said electronic catalog along with a pointer referencing an entry in said catalog category table, thereby associating each item in the electronic catalog with one of said categories;

(c) means for searching the catalog category table to find words that appear in the category names, and for generating a category words array comprising a list of said words along with pointers referencing respective entries in said catalog category table, thereby associating each of said words at any level of the hierarchy with at least one of said categories;

(d) means for displaying the list of words to a user, and allowing a user to select a word from the list; and (e) means for displaying a list of items from said electronic catalog to the user.

6. A computer system according to claim 5 including means for replacing predetermined words in said category words array with generalised versions of those words.

7. A computer system according to claim 5 wherein the category words array is re-generated for each new session initiated by a user.

8. A computer system according to claim 7 further including means for storing a table specifying which item each user in permitted to order, and wherein the for generating the list of words includes means for selecting only words appearing in category names corresponding to item that a current user is permitted to order.

* * * * *